P. W. TOOHEY.
COASTER BRAKE.
APPLICATION FILED NOV. 9, 1909.
960,736.
Patented June 7, 1910.
2 SHEETS—SHEET 1.
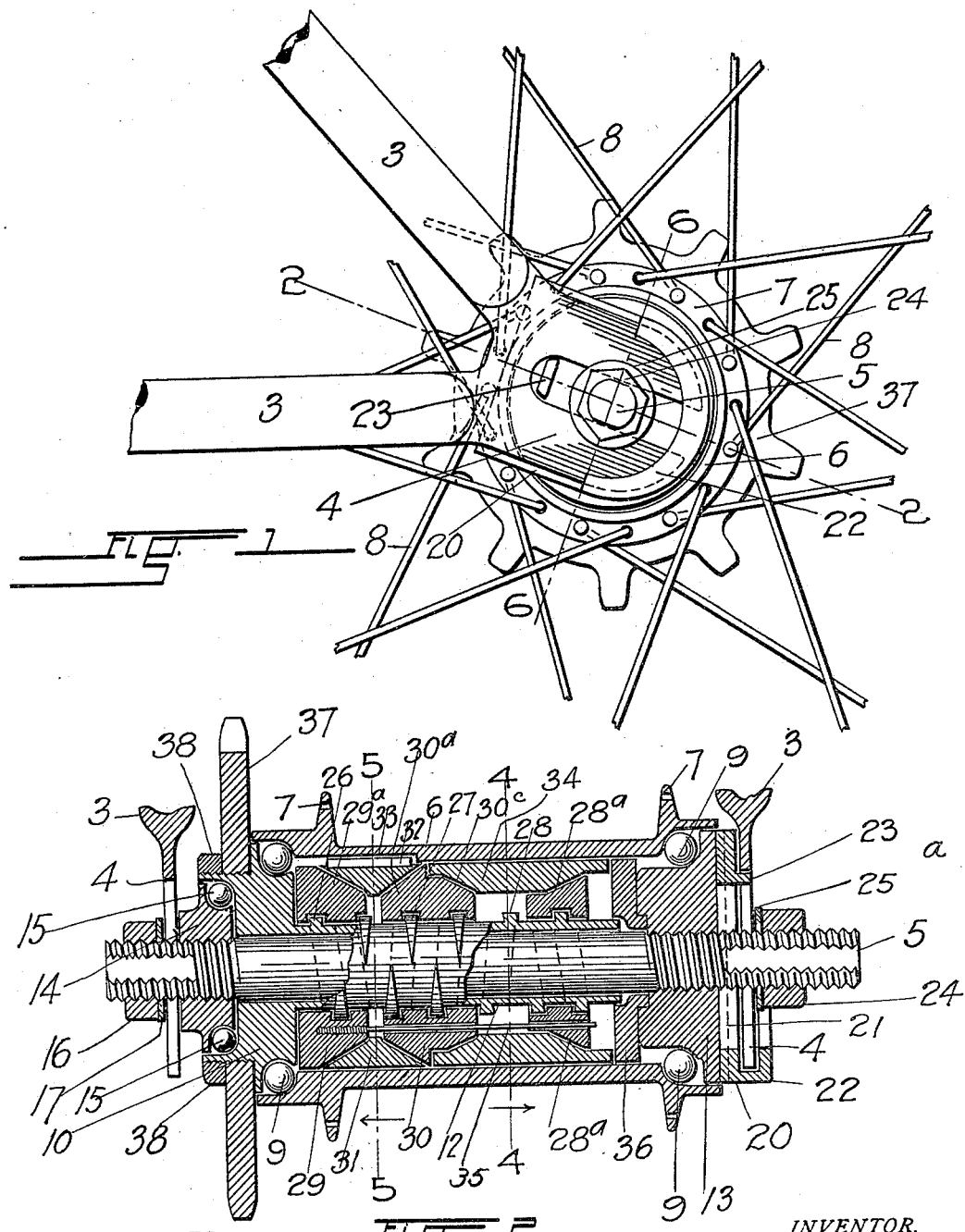
WITNESSES:
M. L. Geary
F. H. Cuno
INVENTOR.
P. W. Toohey
BY
ATTORNEY.

P. W. TOOHEY.
COASTER BRAKE.
APPLICATION FILED NOV. 9, 1909.
960,736.
Patented June 7, 1910.
2 SHEETS—SHEET 2.
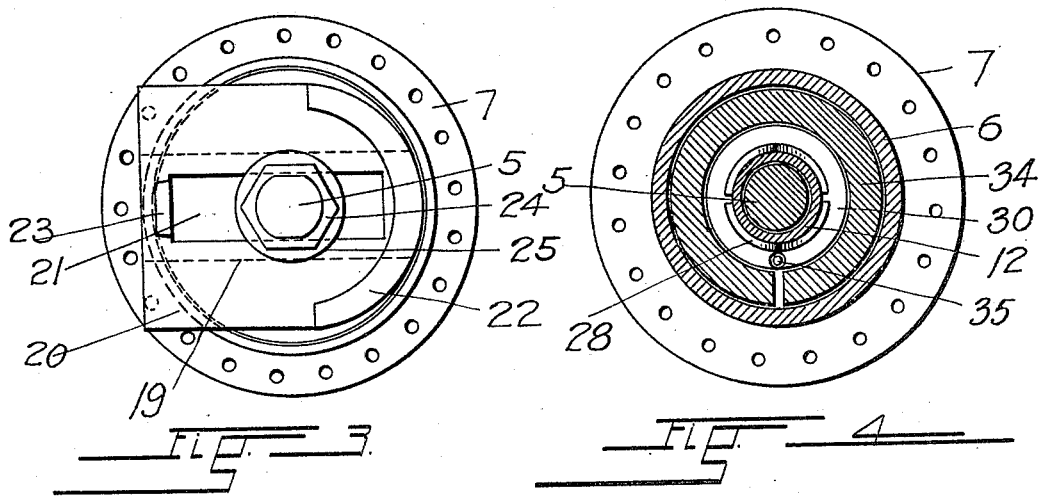
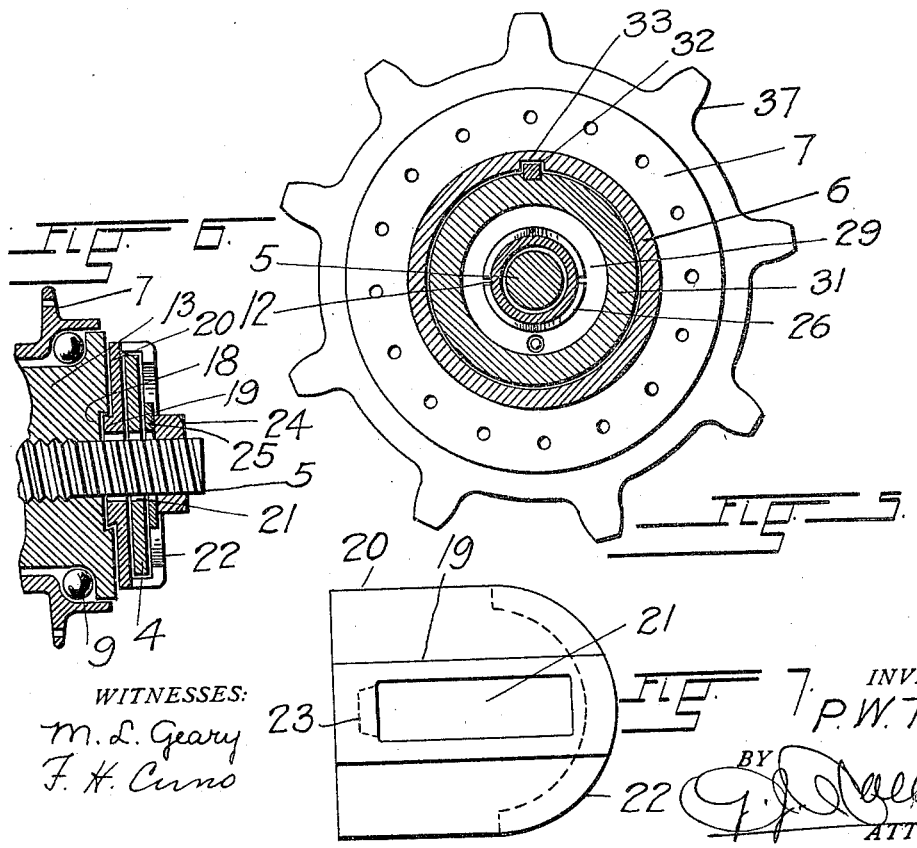
WITNESSES:
M. L. Geary
F. H. Cuno
INVENTOR.
P. W. Toohey
BY
ATTORNEY.

UNITED STATES PATENT OFFICE.

PATRICK W. TOOHEY, OF COLORADO SPRINGS, COLORADO, ASSIGNOR TO THE STERLING NOVELTY COMPANY, OF COLORADO SPRINGS, COLORADO.

COASTER-BRAKE.

960,736.  Specification of Letters Patent.  Patented June 7, 1910.

Application filed November 9, 1909. Serial No. 527,040.

*To all whom it may concern:*

Be it known that I, PATRICK W. TOOHEY, a citizen of the United States of America, residing at Colorado Springs, in the county of El Paso and State of Colorado, have invented certain new and useful Improvements in Coaster-Brakes, of which the following is a specification.

This invention relates to certain new and useful improvements in coaster-brakes for bicycles and other vehicles and it has for its object the provision of a device of the class named the operative parts of which combine simplicity of construction with great efficiency and practicability in use and in which the position of the wheel to which the invention is applied, relative to the vehicle-frame, may be readily and accurately adjusted while insuring the parallelism of the said wheel with others on the same vehicle.

I attain the above objects by the mechanism illustrated in the accompanying drawings in the various views of which like parts are similarly designated and in which—

Figure 1, represents the rear portion of a bicycle frame with my improved device in operative position, Fig. 2, a longitudinal section taken along the line 2—2 Fig. 1, Fig. 3, an end view of the detached wheel hub and the therewith associated parts looking in the direction of the arrow *a* Fig. 2, Fig. 4, a transverse section along the line 4—4 Fig. 2, Fig. 5, a similar section taken along the line 5—5 Fig. 2, Fig. 6, a fragmentary cross section along the line 6—6 Fig. 1, and Fig. 7, an inside view of the sliding connection between the wheel-axle and the bicycle frame.

Referring to the drawings by numerical reference characters, let the numeral 3 designate the rearwardly converging bars of a bicycle-frame, which terminate in the forks 4 between whose members, the axle 5 of the wheel is adjustably secured.

The wheel-hub 6 which, as usual, is provided with flanges 7 to which the extremities of the wheel-spokes 8 are fastened, is revolubly mounted, at its extremities, upon series of anti-friction balls 9 which are loosely disposed in circular runways formed, respectively, in the integral head 10 of a sleeve 12 which surrounds the central portion of the axle, and in a keeper 13 which is screwed upon the threaded end thereof. The head 10 through which the opposite extremity of the axle protrudes, is recessed in its outer face for the reception of a bearing-cone 14 and the therewith associated anti-friction balls 15, upon which the said head is revolubly supported.

The cone 14 is secured upon the axle which to this end is provided at its extremity, with screw threads while a nut 16 and a washer 17 are mounted upon the said extremity for the purpose of clamping the latter in place on the fork 4 between the members of which it is disposed. The keeper 13 at the opposite end of the axle has in its outer face a central, transverse guideway 18 which is occupied by a correspondingly formed tenon 19 formed integral with a plate 20 which has a central longitudinal slot 21 through which the corresponding end of the axle 5 projects.

An internally recessed, arcuate flange 22 at one extremity of the plate 20, is designed to receive the terminal portions of the bifurcated extremity 4 of the wheel frame, while a lug 23 projecting outwardly from the plate at its opposite end, extends between the members of the said extremity for the purpose of holding the keeper 13 and the therewith connected axle 5 against rotation on the frame. A nut 24 and a washer 25 mounted upon the protruding, threaded end of the axle, serve to clamp the forked extremity 4 of the frame upon the plate 20.

The sleeve 12 which, as stated hereinbefore, loosely surrounds the axle 5, is formed upon its circumferential surface, with three consecutively arranged screw-threads 26, 27 and 28, the intermediate one of which is pitched oppositely to the outer ones.

Mounted upon the threads 26 and 27, are two nuts 29 and 30 whose opposite, inner portions $29^a$ and $30^a$ are beveled like the circular segment of a cone to frictionally engage correspondingly beveled faces of an interposed annulus 31 which is provided upon its circumference with a longitudinally extending spline 32 which projects into a corresponding key-seat 33 in the interior surface of the hub 6. A third nut 58 is mounted upon the thread 28 and the nut 30, which as stated above, is disposed between the others, has opposite to its bevel $30^a$, a similar, reversely directed beveled face $30^c$ while the nut 58 has at its inner end, a beveled face $28^a$, which extends oppositely to that on the nut 30. When the oppositely pitched nuts 58 and 30 are drawn together, as will hereinafter be explained their beveled faces 28ᵃ and 30ᶜ engage corresponding, convergent surfaces on a split brake-ring 34, which when expanded, will circumferentially, engage the interior surface of the cylindrical hub 6.

A guide-rod 35 whose extremity is secured in the nut 29, extends parallel to the axle 5, loosely through bores in the other nuts 30 and 58, for the purpose of holding them against independent rotation, and a washer 36 is interposed between the keeper 13 and the extremity of the brake 34 mainly to support the corresponding end of the sleeve 12.

A toothed drive wheel 37 is rigidly secured upon the circumferential surface of the head 10 on the sleeve 12 and is held in place by means of a nut 38.

When the wheel to which my invention is applied, is propelled in a forward direction by an impellent force exerted upon the drive-wheel 37, the two oppositely pitched nuts 29 and 30 will move toward each other and the interposed ring 31 to frictionally engage the latter and through the instrumentality of the spline 32, convey the rotary movement of the wheel 37 and the therewith connected sleeve 12 upon the axle 5, to the therewith concentric hub 6.

By holding the member 37 stationary, the impetus of the wheel of which the hub 6 forms part, will cause the nuts 29 and 30 to separate so as to disengage the ring 31 and, in consequence, to allow the wheel to move about the fixed axle 5, independent of the drive-wheel, a movement commonly known as "Coasting."

To retard and subsequently arrest the movement of the vehicle, the wheel 37 is turned backward by a reverse movement of the impellent agent, with the result that the oppositely pitched nuts 30 and 58 are moved toward each other and the interposed split ring 34 whose convergent faces are engaged by the respective faces of the two nuts. The ring 34, will, as a result of this action, expand until the frictional contact between its circumferential surface and the interior surface of the hub 6, is sufficiently intense to arrest independent movement of the latter.

To adjust the position of the wheel on the vehicle frame, the nuts 16 and 24 are loosened and the axle 5 is moved the desired distance between the members of the two forks 4.

The sliding connection of the plate 20 with the keeper 13 on the axle 5 and with the fork 4, will not only insure the proper position of the axle on the frame after the adjustment is made and the nuts 16 and 24 screwed home, but it will effectually obviate the use of the laterally projecting arm and the therewith associated fastening means commonly employed to prevent the stationary parts of the mechanism from rotating upon the axle.

It will be observed that the present construction differs from that disclosed in the United States Patent No. 904,735, granted to me on the 24th day of November 1908, in which oppositely pitched nuts are coöperative with an interposed integral portion of the hub, not only in the brake mechanism and the adjusting devices but also in that the ring 31 is made separate from the hub and thus easily renewed, in that the frictional contact is produced between oppositely beveled surfaces and thus rendered more positive and in that the hub can be made cylindrical which is obviously preferable.

What I claim and desire to secure by Letters Patent is:—

1. In a device of the class described, the combination with the fixed axle, of a driving element revolubly mounted thereon and including a surrounding sleeve having oppositely pitched threads, a hub revoluble about the axle and having an internal keyseat, a friction element having a spline in the said seat, and nuts mounted upon the respective threads, adapted to frictionally engage the said element during their movement toward each other.

2. In a device of the class described, the combination with the fixed axle, of a driving element revolubly mounted thereon and including a surrounding sleeve having three consecutively arranged screw threads the middle one of which is pitched opposite to the others, a hub revoluble about the axle, nuts mounted upon the respective threads, a friction element connected with the said hub between the middle nut and one of the outer ones to be frictionally engaged thereby during their movement toward each other, and an expansible brake element interposed between the middle nut and the other outer one to frictionally contact with the hub when engaged by the last named nuts during their movement toward each other.

3. In a device of the class described, the combination with the fixed axle, of a driving element revolubly mounted thereon and including a surrounding sleeve having three consecutively arranged screw threads the middle one of which is pitched opposite to the others, a hub revoluble about the axle, nuts mounted upon the respective threads, a friction element connected with the said hub between the middle nut and one of the outer ones to be frictionally engaged thereby during their movement toward each other, an expansible brake-element interposed between the middle nut and the other outer one to frictionally contact with the hub when engaged by the last named nuts during their movement toward each other and means for preventing independent rotation of the three nuts.

4. In a device of the class described, the combination with the fixed axle, of a driving element revolubly mounted thereon and including a surrounding sleeve having three consecutive screw threads the middle one of which is pitched opposite to the others, a hub revoluble about the said axle, nuts mounted upon the respective threads the middle nut having two oppositely beveled faces and the outer nuts being beveled toward the inner one, a beveled friction ring between the middle nut and one of the outer ones to be frictionally engaged thereby during their movement toward each other, and a beveled expansible ring disposed between the middle nut and the other outer one and adapted to frictionally contact with the interior surface of the hub when its beveled portion is engaged by the corresponding faces of the last named nuts during their movement toward each other.

5. In a device of the class named, an axle, a hub revoluble thereon, a plate held against rotation on the axle and transversely adjustable with relation thereto, and a nut on said axle, coöperative with said plate to clampingly secure the axle to an interposed object.

6. In a device of the class named the combination with a suitable frame of an axle adjustably secured thereon at one of its ends, a plate transversely adjustably connected with the opposite end of the axle and adapted to hold the same against rotation by connection with the frame, a nut on said axle, adapted to clampingly secure the axle in position relative to the said plate and the said frame, and a hub revoluble around the axle.

7. In a device of the class named the combination with a suitable frame, of an axle adjustably secured thereon at one of its ends, a keeper mounted on the axle at its opposite end, a plate transversely slidable on the said keeper and connected with the said frame, a nut on the axle adapted to clamp the same in position relative to said plate and the said frame, a driving element revolubly mounted on the axle, a hub revoluble around the same, and a mechanism for transmitting the movement of the said element to the said hub.

8. In a device of the class named, the combination with a suitable frame having forked extremities, of an axle adjustably secured at one of its ends in one of said extremities, a plate transversely adjustably connected with the axle at its opposite end and having a lug projecting between the prongs of the other forked extremity a nut on the said axle adapted to engage the frame so as to clampingly secure the axle in position relative to the latter and the plate, a driving element revolubly mounted on the axle, and a hub revoluble around the axle.

9. In a device of the class named, the combination with a suitable frame having forked extremities, of an axle adjustably secured at one of its ends in one of said extremities, a plate transversely adjustably connected with the axle at its opposite end and having a lug projecting between the prongs of the other forked extremity and an abutment for the ends thereof, a nut on the said axle adapted to engage the frame so as to clampingly secure the axle in position relative to the latter and the plate, a driving element revolubly mounted on the axle, and a hub revoluble around the axle.

In testimony whereof I have affixed my signature in presence of two witnesses.

PATRICK W. TOOHEY.

Witnesses:
 WILLIAM H. AITKEN,
 GEO. M. IRWIN.